Aug. 18, 1942.   J. A. STARR   2,293,520
COTTON PACKER
Filed July 15, 1938

Joel A. Starr
INVENTOR.

BY J. Preston Swecker
his ATTORNEY.

Patented Aug. 18, 1942

2,293,520

UNITED STATES PATENT OFFICE 2,293,520

COTTON PACKER

Joel A. Starr, Archer City, Tex.

Application July 15, 1938, Serial No. 219,481

9 Claims. (Cl. 100—25)

This invention relates to an improvement in cotton packers designed for the packing of cotton in a bale box or other receptacle.

After the seed is ginned from the cotton, the lint cotton is conveyed into a bale box and due to its lightness it must be packed initially in order to get a sufficient amount of lint into the bale box to form a bale. After this initial packing in the bale box, the bale is compressed further by hydraulic or other power means to complete the baling action and to compress the cotton as much as possible, to facilitate handling in shipping. This invention is designed to accomplish this packing or pressing action in the bale box.

The principal object of this invention is to provide for the repeating of the cycle of operation of the cotton packer, without manual attention and in the simplest, most efficient, and mechanically powerful manner possible, which is accomplished by operating the packing head or member by means of a lazy tong structure, which is operated in turn by coacting gearing.

A further object of the invention is to provide for the self centering of the packing head on an extensible packing device, so as to maintain the packing head in proper position for operation.

In carrying out these objects, the invention is embodied in a preferred form thereof which is illustrated in the accompanying drawing in which.

Figure 1:
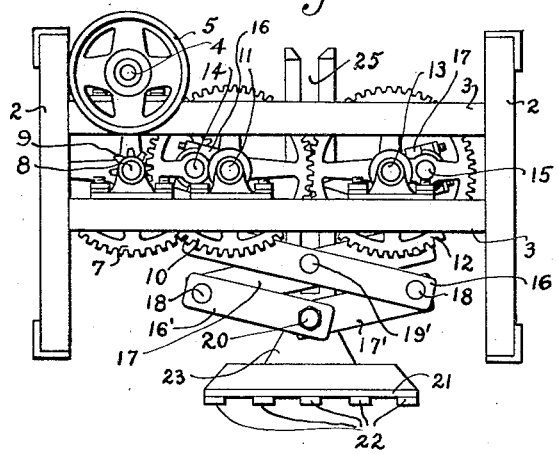
Fig. 1 is a side elevation of the cotton packer with the packing head in raised position.
Figure 3:
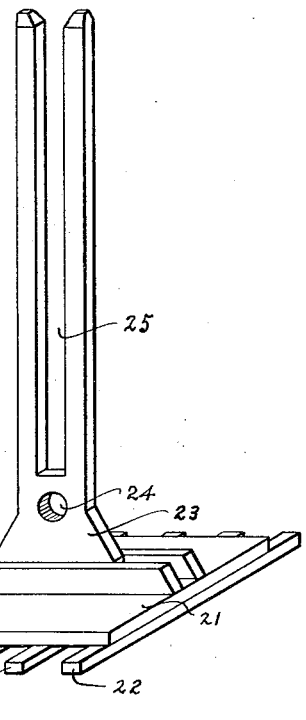
Fig. 3 is a perspective view of the packing head and its guide member.
Figure 2:
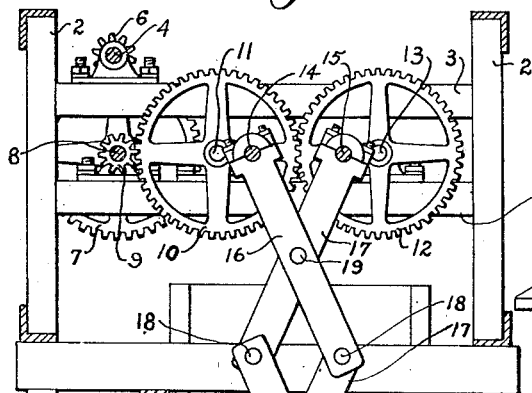
Fig. 2 is a vertical sectional view therethrough, substantially on the line 2—2 of Fig. 4, parts being in elevation and showing the packing head in extended position.
Figure 4:
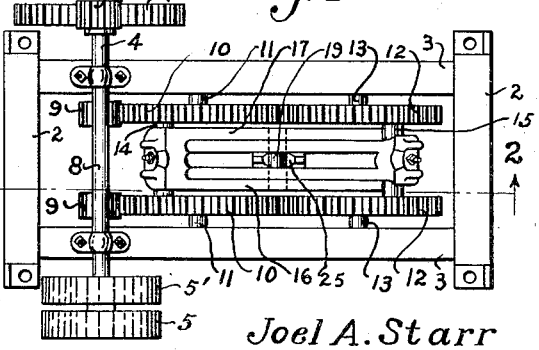
Fig. 4 is a top plan view of the cotton packer.

A bale box is designated generally by the numeral 1 and is illustrated in Fig. 2 in the position which it would normally assume beneath the cotton packer which constitutes this invention, the bale box being adapted for removal therefrom or for opening so as to remove the bale therefrom.

Mounted in an elevated position over the bale box 1, or in longitudinal alignment therewith is a frame comprising end supports 2, suitably braced and supported in any convenient manner, and joined together by side bars 3, which are rigidly attached thereto. This frame supports the packing mechanism and the operating means therefor.

Mounted upon the uppermost side bars 3 is a countershaft 4, having driving pulleys 5 and 5', mounted on the outer end thereof, while a pinion 6 is mounted on the inner end of said shaft 4. Meshing with the pinion 6 is a large gear 7 on a transverse shaft 8, below the shaft 4 and journaled upon the lowermost side bars 3. The shaft 8 also carries a pair of pinions 9 intermediate the side bars 3 and within the frame of the packer.

Pinions 9 mesh with a pair of gears 10 journaled on stub shafts 11 mounted on the side bars 3 of the frame. The gears 10 also mesh with a pair of gears 12, likewise journaled on stub shafts 13 supported on the side bars 3 of the frame. The pairs of gears 10 and 12 are of equal size and intermesh so as to operate in opposite directions and at the same speed of operation, being driven by the pinions 9 from the shaft 8. The pairs of gears 10 and 12 carry crank pins 14 and 15, respectively, which crank pins extend transversely between the gears 10 and 12 and are joined to both gears of each pair being in bridging relation between the gears.

Supported by the crank pins 14 and 15 is an extensible packing device comprising series of links 16 and 17, the uppermost ends of which are journaled on the crank pins 14 and 15, while the links 16 and 17 are pivoted together at their extreme ends at 18 and are pivoted intermediate their ends on pivot pins 19 and 19'. At the lower end of the extensible device are short links 16' and 17' having their ends connected together on a bolt or pin 20.

A packing head or member 21 is formed with a series of transverse bars 22 on its lower side to obtain maximum packing effect on the cotton, and at its upper side said packing member has rigidly secured thereto a plate 23, having the opening 24 therein receiving the pivot pin or bolt 20, and forming a journal support for the packing head or member on the lower end of the extensible device. The upper end portion of the plate 23 is bifurcated at 25 to receive therein the pivot pin 19'.

The packer is mounted directly above the bale box 1 and operates in a repeating cycle as long as desired. A belt extending over the pulley 5 or 5' operates the shaft 4 to drive the shaft 8 through the pinion 6 and gear 7. Pinions 9 on the shaft 8 rotate the pairs of gears 10 and 12 in opposite directions and cause the crank pins 14 and 15 to move in opposite directions alternately to draw together or to separate the upper end portions of the links 16 and 17 of the lazy tong device. The pivotal connections 18 and 19 between these links causes them to be extended or contracted in a straight line, reciprocating the packing head or member 21 in the bale box 1. The packing head or member, being supported on its pivot pin or bolt 20 at the lower end of the extensible device, is guided by the bifurcation 25, receiving the pivot pin 19', which holds the packing head always in the proper position for pressing the cotton in the bale and acting flatwise on the cotton therein. No auxiliary guiding wheels or guide ways are necessary, as the entire packer unit is self-contained and it operates efficiently and powerfully to compress the cotton in the bale box or press box, repeating its cycle of operation as long as desired until the proper packing effect is obtained on the cotton.

I claim:

1. A cotton packer comprising a frame, gearing mounted thereon and including a pair of intermeshing gears, a lazy tong device having one end portion thereof connected eccentrically with the gears and extensible and contractible upon operation of the gears, and a packing head carried by the outer end of said lazy tong device.

2. A cotton packer comprising a frame, intermeshing gears mounted on the frame, a lazy tong device operatively connected with the gears eccentrically thereof and extensible and contractible upon operation of the gears, a packing head carried at the outer end portion of the lazy tong device, and means connected with the lazy tong device for guiding the movement of said head.

3. A cotton packer comprising a frame, intermeshing gears mounted on the frame, a lazy tong device operatively connected with gears eccentrically thereof and extensible and contractible upon operation of the gears, a packing head carried at the outer end portion of the lazy tong device, said lazy tong device having a pin thereon, and a bifurcated member attached to the head and embracing said pin for guiding the movement of the head by the lazy tong device.

4. A cotton packer comprising a frame, a pair of intermeshing gears mounted on the frame, means for operating said gears, a lazy tong device having end links pivoted to the gears eccentrically thereof, a packing head pivotally supported by the lazy tong device at the opposite end thereof, said lazy tong device having a pivot pin and a plate attached to the packing head with a bifurcated portion embracing said pivot pin for guiding the head thereby.

5. In a cotton packer comprising a frame, intermeshing gears mounted on the frame for operation in opposite directions, crank pins carried by the gears, a lazy tong device having series of links pivotally connected together for extensible and contractible movement, the end links being journaled on the crank pins, a packing head having a pivotal connection with the lower end links and carried thereby, a plate attached to said head and having a bifurcated portion, and a pivot pin on the lazy tong device engaging in said bifurcated portion and guiding the movement of the head.

6. A cotton packer comprising a structure having opposite end frames, laterally spaced side bars extending between and connecting the end frames together, a pair of intermeshing gears journaled on one of the side bars between the end frames, a lazy tong device, having one end portion thereof connected eccentrically with the gears for extensible and contractible movements upon operation thereof, said lazy tong device being suspended from the gears, and a packer head pivotally suspended from the lazy tong device.

7. A cotton packer comprising a structure having opposite upright end frames, pairs of spaced side bars extending between and connecting the end frames together at each opposite side thereof, a pair of intermeshing gears journaled on the inner side of each pair of laterally spaced side bars in spaced relation from each other, power means for operating said gears, the opposed gears having crank-pins extending therebetween in bridging relation, a lazy tong device having one end portion thereof journaled respectively on the crank-pins for extensible and contractible movements on rotation of the gears, said lazy tong device extending downwardly from the gears, and a packer head plate having an upstanding bracket pivotally suspended from the lower end of the lazy tong device.

8. A cotton packer comprising a structure having opposite upright end frames, pairs of spaced side bars extending between and connecting the end frames together at each opposite side thereof, a pair of intermeshing gears journaled on the inner side of each pair of laterally spaced side bars in spaced relation from each other, power means for operating said gears, the opposed gears having crank-pins extending therebetween in bridging relation, a lazy tong device having one end portion thereof journaled respectively on the crank-pins for extensible and contractible movements on rotation of the gears, said lazy tong device extending downwardly from the gears, a packer head plate having an upstanding bracket pivotally suspended from the lower end of the lazy tong device, and a bifurcated arm attached to the bracket and having guiding connection with the lazy tong device.

9. A cotton packer comprising a frame, intermeshing gears mounted on the frame, a lazy tong device operatively connected with the gears eccentrically thereof and extensible and contractable upon operation of the gears, said lazy tong device including elements pivotally connected together intermediate the ends thereof, a packing head carried by the outer end portion of the lazy tong device, and guiding means secured to said packing head and connected with the lazy tong device approximately at one of said pivotal connections between the elements for guiding the movement of said packing head.

JOEL A. STARR.